(12) United States Patent
Demichael

(10) Patent No.: US 8,058,591 B2
(45) Date of Patent: Nov. 15, 2011

(54) SYSTEMS AND METHODS FOR PROVIDING LOCALIZED HEAT TREATMENT OF GAS TURBINE COMPONENTS

(75) Inventor: Thomas Demichael, East Hartford, CT (US)

(73) Assignee: United Technologies Corp., Hartford, CT (US)

( * ) Notice: Subject to any disclaimer, the term of this patent is extended or adjusted under 35 U.S.C. 154(b) by 442 days.

(21) Appl. No.: 11/694,227

(22) Filed: Mar. 30, 2007

(65) Prior Publication Data

US 2009/0065494 A1  Mar. 12, 2009

(51) Int. Cl.
H05B 1/02 (2006.01)
(52) U.S. Cl. .................. 219/497; 29/889.1; 228/119
(58) Field of Classification Search .................. 219/419, 219/482
See application file for complete search history.

(56) References Cited

U.S. PATENT DOCUMENTS

| | | | |
|---|---|---|---|
| 3,548,149 A | 12/1970 | Rizzolo et al. | |
| 4,531,036 A | 7/1985 | Lewis | |
| 4,541,898 A * | 9/1985 | Mase et al. | 205/794.5 |
| 4,611,744 A * | 9/1986 | Fraser et al. | 228/119 |
| 4,657,171 A | 4/1987 | Robins | |
| 5,185,513 A | 2/1993 | Pacileo | |
| 5,205,465 A | 4/1993 | Bogard et al. | |
| 5,549,768 A | 8/1996 | Mahoney | |
| 5,762,727 A | 6/1998 | Crawmer et al. | |
| 6,037,571 A * | 3/2000 | Christopher | 219/450.1 |
| 6,117,564 A | 9/2000 | Crawmer et al. | |
| 6,536,110 B2 * | 3/2003 | Smith et al. | 29/889.21 |
| 6,693,173 B2 | 2/2004 | Mamidi et al. | |
| 6,787,740 B2 | 9/2004 | Smith et al. | |
| 6,902,096 B2 | 6/2005 | Robertson et al. | |
| 7,146,725 B2 | 12/2006 | Kottilingam et al. | |
| 2002/0195176 A1 * | 12/2002 | Smith et al. | 148/526 |

FOREIGN PATENT DOCUMENTS

| | | |
|---|---|---|
| EP | 1253289 | 10/2002 |
| GB | 1108124 | 4/1968 |
| JP | 54084308 | 6/1979 |
| JP | 55008462 | 1/1980 |
| JP | 56163091 | 12/1981 |

OTHER PUBLICATIONS

Abstract of JP 56-163091.*
Abstract of JP 55-008462.*
European Search Report from related European Patent Application No. 08250939.9.
European Office Action.

* cited by examiner

*Primary Examiner* — Tu B Hoang
*Assistant Examiner* — Brian Jennison

(57) ABSTRACT

Systems and methods for providing localized heat treatment of gas turbine components are provided. In this regard, an exemplary method includes: identifying an area of a gas turbine component to which localized heat treatment is to be performed; positioning a resistance heating element, sized and shaped to transfer heat to the area, adjacent the area; electrically coupling a current-limiting power controller to the resistance heating element; and locally heating the area using the resistance heating element, with power being provided to the resistance heating element via the current-limiting power controller.

16 Claims, 3 Drawing Sheets

US 8,058,591 B2

SYSTEMS AND METHODS FOR PROVIDING LOCALIZED HEAT TREATMENT OF GAS TURBINE COMPONENTS

BACKGROUND

The manufacture, service and/or repair of gas turbine engines oftentimes requires localized heating of specified areas of engine components to allow for stress relief, metal forming and/or brazing applications. Localized heating is preferred when processing the entire component in an isothermal heat treatment oven could adversely affect the metallographic properties of the materials of the component.

In this regard, prior art localized heating methods include resistance and induction heating. Induction heating methods tend to be costly, afford little process control, and require extensive experience of an operator in order to match induction coils to both the induction generator and the component/cross sectional area being heated. In contrast, resistance heating is somewhat limited in that the power supplies are current matched to specific heating element designs. The necessity in the prior art of matching the power supplies and the heating elements has typically resulted in rather generic heating assemblies in the form of blankets that typically are much larger than the areas that require heating.

SUMMARY

Systems and methods for providing localized heat treatment of gas turbine components are provided. In this regard, a representative embodiment of such a method comprises: identifying an area of a gas turbine component to which localized heat treatment is to be performed; positioning a resistance heating element, sized and shaped to transfer heat to the area, adjacent the area; electrically coupling a current-limiting power controller to the resistance heating element; and locally heating the area using the resistance heating element, with power being provided to the resistance heating element via the current-limiting power controller.

Another embodiment of a method comprises: identifying an area of a gas turbine component to which localized heat treatment is to be performed; positioning a resistance heating element, sized and shaped to transfer heat to the area, adjacent the area, the resistance heating element comprising wire and at least one ceramic insulator; electrically coupling a current-limiting power controller to the resistance heating element, the current-limiting power controller not being electrically matched to the resistance heating element such that various other resistance heating elements of various electrical characteristics are usable with the current-limiting power controller; and locally heating the area using the resistance heating element, with power being provided to the resistance heating element via the current-limiting power controller.

An embodiment of a system for providing localized heat treatment of a gas turbine component comprises: a resistance heating element having a wire and at least one ceramic insulator; and a current-limiting power controller having a silicon controlled rectifier, the power controller being operative to receive electrical power from an AC power source and to provide current-limited electrical power to the resistance heating element.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views. While several embodiments are described in connection with these drawings, there is no intent to limit the disclosure to the embodiments disclosed herein. On the contrary, the intent is to cover all alternatives, modifications and equivalents.

DETAILED DESCRIPTION

Figure 1:
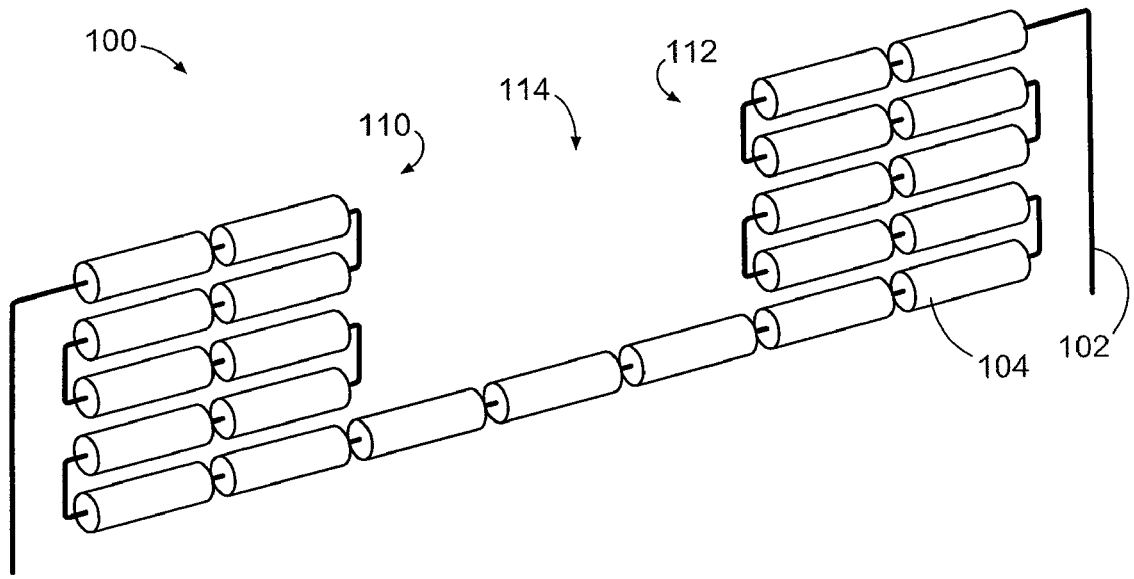
FIG. 1 is a schematic view of an embodiment of a resistance heating element.

As will be described in detail here with respect to several exemplary embodiments, systems and methods for providing localized heat treatment of gas turbine components are provided. In this regard, FIG. 1 depicts an exemplary embodiment of a resistance heating element 100. Element 100 is generally formed of a length of wire 102 (e.g. NiCr wire) that is attached to one or more insulators 104 (e.g., ceramic insulators). In this embodiment, multiple insulators are provided, each of which is generally cylindrical in shape and includes a hollow interior through which the wire is threaded. Depending upon the particular electrical and heating properties desired, various sizes, shapes, gauges and configurations of wire and insulators can be provided.

The embodiment of FIG. 1 has been designed to provide localized heating to two areas that are spaced from each other. Notably, element 100 provides a first heating zone 110 that is spaced from a second heating zone 112, with a gap 114 being located therebetween. Note that a single row of insulators and an associated length of wire electrically interconnects the first and second heating areas, thereby providing electrical continuity to the element.

In contrast to prior art resistance heating elements, which are current-matched to their respective power sources, various configurations of resistance heating elements, such as element 100, can be used with the same power source, details of which will be discussed later.

Figure 2:
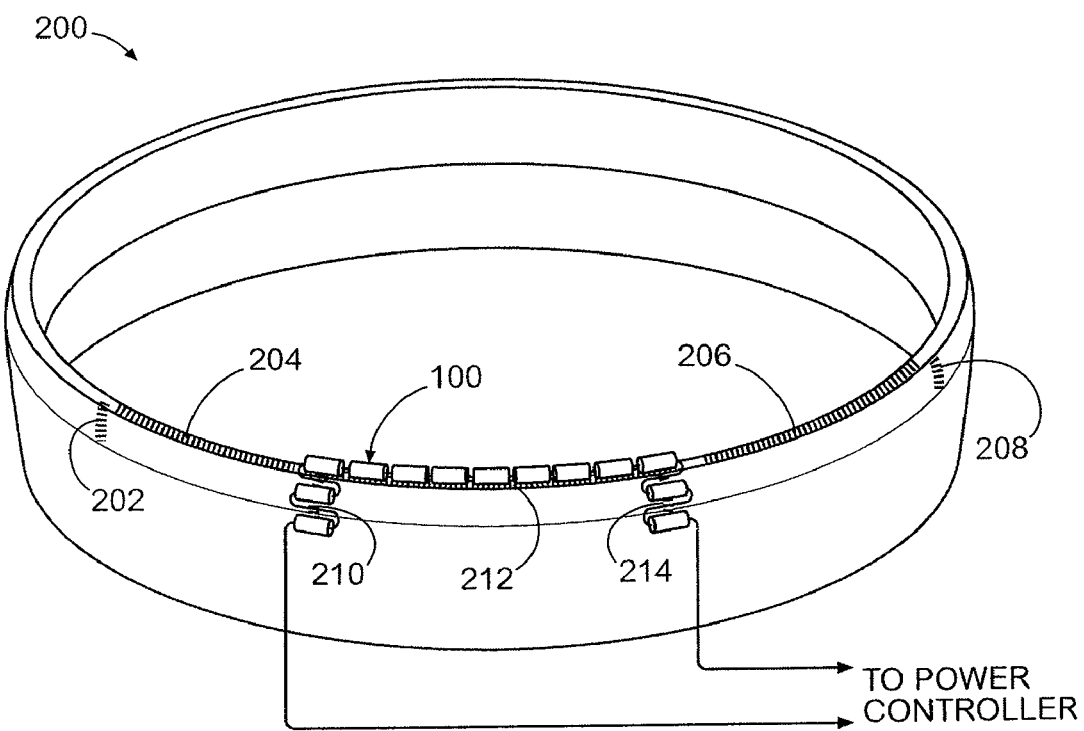
FIG. 2 is a schematic diagram depicting an embodiment of a turbine case section of a gas turbine engine with the resistance heating element of FIG. 1 positioned to locally heat selected portions of the casing.

The configuration of the embodiment of FIG. 1 may be particularly well suited for various applications, such as the exemplary application depicted in FIG. 2. As shown in FIG. 2, a section of gas turbine casing 200 includes several repair welds, such as welds 202, 204, 206 and 208, as well as welds 210, 212 and 214 that are positioned underneath heating element 100. The element 100 is attached to the turbine casing so that heat can be directed toward the welds in order to provide stress relief to the material associated with the welds. In order to facilitate attachment of the element to the casing, various techniques can be used, such as high temperature tape or stainless steel wire for example. Notably, the resistance heating element is electrically connected to a power controller (not shown) that provides current-limited electrical power to the element. Various aspects of the power controller will now be described with respect to FIG. 3.

Figure 3:
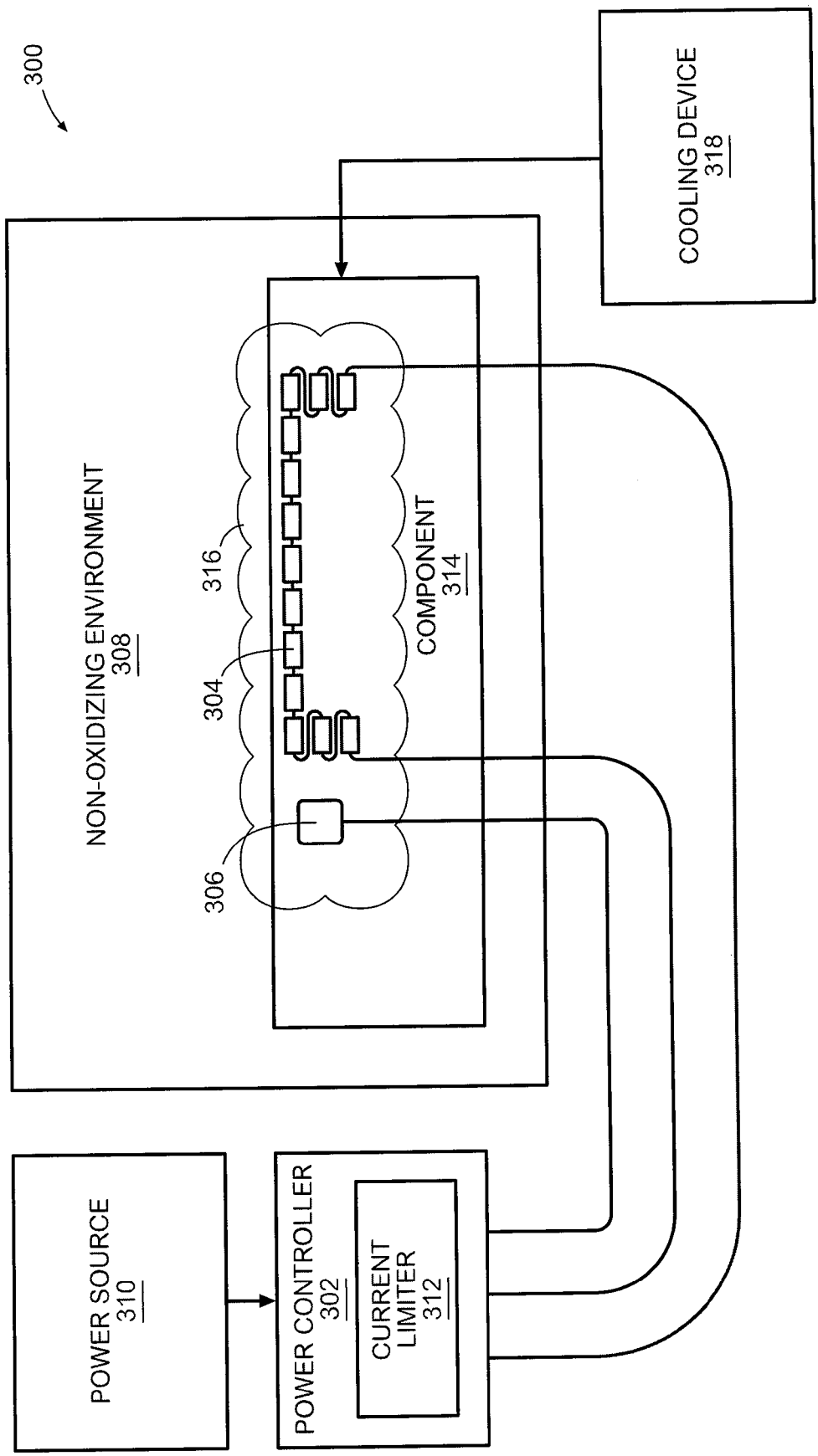
FIG. 3 is a schematic diagram of an embodiment of a system for providing localized heat treatment.

As depicted in FIG. 3, an embodiment of a system 300 for providing localized heat treatment comprises a power controller 302, a resistance heating element 304, a thermocouple 306, and a non-oxidizing environment 308. The power controller receives a voltage input from a power source 310, which can be a conventional 110 volt outlet in some embodiments. The power controller converts the input to a current-limited output using a current limiter 312 that, in some embodiments, can be a silicon controlled rectifier (SCR). Notably, such an SCR can be controlled either by a manually controlled input, such as via a potentiometer, or by a proportional-integral-derivative (PID) controller. By altering output of the power controller 302, temperature control through heat-up, soak and cool down cycles can be provided.

It should be noted that the component that is to be heat treated is located within non-oxidizing environment 308. By way of example, such an environment can be formed by a heat resistant enclosure that is flooded with an inert gas, such Argon. For performing heat treatments, the component 314 is placed within the non-oxidizing environment and one or more heating elements are attached to the component as described before with reference to FIG. 2. Thermocouple 306 also is attached to the component, in a vicinity of the heating element, so that heating can be monitored.

Optionally, thermal insulation 316 (e.g., Fiberfax insulation) is used to cover the heating element in order to reduce heat dissipation from the area that is to be heat-treated. Additionally or alternately, a cooling device 318 can be used to provide localized cooling, such as to areas adjacent to those areas that are to be heat-treated (e.g., a portion of the gas turbine component that is to be treated, etc.). In some embodiments, the cooling device can be a cooling fan and or a closed-loop cooling system, such as one that uses a liquid (e.g. water), for providing cooling.

Figure 4:
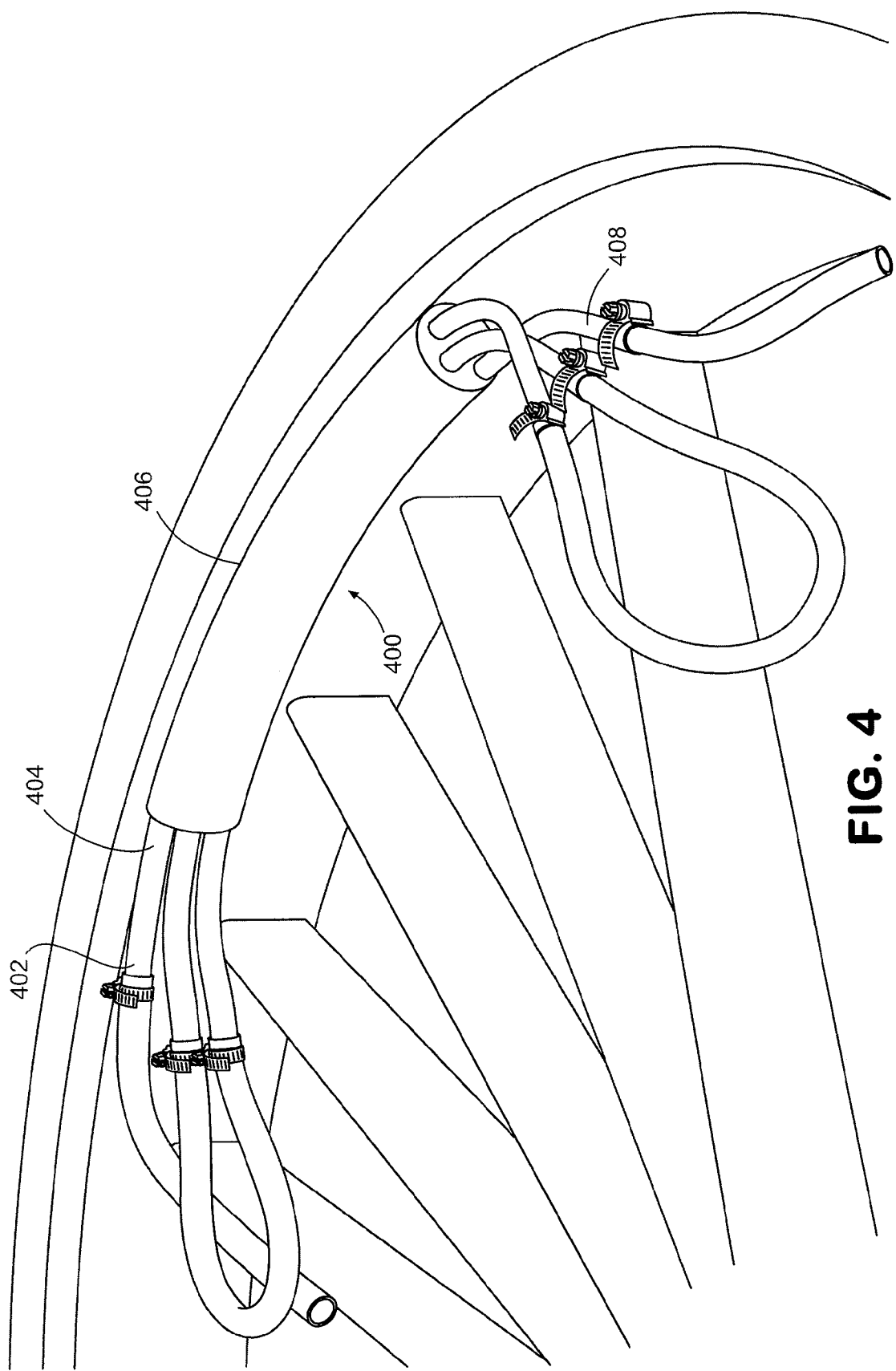
FIG. 4 is a schematic diagram of an embodiment of a cooling device.

An exemplary embodiment of a cooling device is partially depicted in FIG. 4. As shown in FIG. 4., a heat exchanger portion 400 of a cooling device is attached to a gas turbine component to provide localized cooling of the component. The cooling device includes a liquid inlet 402 that provides a flow of cooling fluid to conduit 404, which is thermally coupled to a heat exchange surface 406. Thermal energy from the heat treatment is transferred via the heat exchange surface to the cooling liquid, which is then returned to a circulating pump (not shown) after departing the conduit via a liquid outlet 408.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed is:

1. A method for providing localized heat treatment of a gas turbine component, said method comprising:
    identifying a plurality of welds on a gas turbine component to which localized heat treatment is to be performed, which welds include a first identified weld and a second identified weld;
    configuring a resistance heating element to provide a plurality of localized heating zones including a first heating zone and a second heating zone, wherein the resistance heating element comprises a wire connecting a plurality of ceramic insulators, and wherein the first heating zone comprises a first plurality of the ceramic insulators and the second heating zone comprises a second plurality of the ceramic insulators, the heating zones being separated by a gap with the first and second pluralities of the ceramic insulators being connected by at least one ceramic insulator or a portion of the wire spanning the gap,
    electrically coupling a current-limiting power controller to the resistance heating element; and
    locally heating the first identified weld using the first heating zone of the resistance heating element and the second identified weld using the second heating zone of the resistance heating element, with power being provided to the resistance heating element via the current-limiting power controller.

2. The method of claim 1, wherein the electrically coupling of the current-limiting power controller comprises electrically coupling a silicon controlled rectifier to the resistance heating element.

3. The method of claim 1, further comprising electrically coupling the current-limiting power controller to an AC power source prior to performing the heating.

4. The method of claim 3, wherein the electrically coupling of the current-limiting power controller to the AC power source comprises electrically coupling the current-limiting power controller to a 110V electrical outlet.

5. The method of claim 1, wherein:
    the method further comprises positioning the gas turbine component within an inert gas environment; and
    locally heating the identified welds is performed in the absence of oxygen.

6. The method of claim 5, wherein the positioning of the gas turbine component within the inert gas environment comprises positioning the gas turbine component within an Argon gas environment.

7. The method of claim 1, further comprising wrapping the welds and the resistance heating element in thermal insulation prior to the heating.

8. The method of claim 1, further comprising cooling a portion of the component during the heating.

9. The method of claim 8, wherein the cooling is performed by a closed-loop cooling device positioned adjacent the portion that is to be cooled.

10. The method of claim 1, wherein the wire comprises a length of NiCr wire.

11. The method of claim 1, wherein the identifying of the welds of the gas turbine component comprises identifying a plurality of welds of a turbine casing.

12. The method of claim 1, wherein the heating is performed by manually adjusting output of the current-limiting power controller.

13. A method for providing localized heat treatment of a gas turbine component, said method comprising:
    identifying a weld on a gas turbine component to which localized heat treatment is to be performed;
    a resistance heating element comprising a wire and a plurality of ceramic insulators and adapting the size and shape of the resistance heating element to conform to the identified weld, wherein the adapting the shape of the resistance heating element comprises positioning the ceramic insulators to conform to the identified weld,
    positioning the adapted resistance heating element onto the identified weld;
    electrically coupling a current-limiting power controller to the resistance heating element; and locally heating the identified weld using the resistance heating element, with power being provided to the resistance heating element via the current-limiting power controller.

14. The method of claim 13, further comprising assembling the resistance heating element to accommodate a configuration of the identified weld that is to be heat treated.

15. The method of claim 14, wherein the resistance heating element comprises a length of NiCr wire threaded through cylindrical ceramic insulators.

16. The method of claim 14, further comprising cooling a portion of the component during the heating.

* * * * *